United States Patent [19]
Jacobson

[11] 3,988,888
[45] Nov. 2, 1976

[54] FILTER/COOLER

[75] Inventor: Michael D. Jacobson, Ridgecrest, Calif.

[73] Assignee: The United States of America as represented by the Secretary of the Navy, Washington, D.C.

[22] Filed: June 14, 1974

[21] Appl. No.: 480,188

[52] U.S. Cl. .................................. 60/204; 60/253; 60/39.47; 23/281
[51] Int. Cl.² ..................... F03H 5/00; F23R 1/00
[58] Field of Search ............ 60/228, 230, 231, 204, 60/253, 39.47; 239/265.23; 55/345, 482; 9/321; 102/39; 149/19.3, 2, 21; 23/281

[56] References Cited
UNITED STATES PATENTS

| 2,779,281 | 1/1957 | Maurice et al. ........................ 102/39 |
| 3,070,957 | 1/1963 | McCorkle ......................... 239/127.3 |
| 3,147,590 | 9/1964 | Thielman ............................... 60/231 |
| 3,225,526 | 12/1965 | Bayles et al. ........................... 55/482 |
| 3,515,518 | 6/1970 | Halstead et al. ......................... 9/321 |
| 3,877,882 | 4/1975 | Lette et al. ............................. 102/39 |

*Primary Examiner*—Samuel Feinberg
*Attorney, Agent, or Firm*—R. S. Sciascia; Roy Miller

[57] ABSTRACT

A filter-cooler is provided for use with a rocket motor to cool and filter highly aluminized hot gases from around 5800° F to around 2000° F. The cooled and filtered gases are then usable, for example, in thrust vector control mechanisms. A decomposable chemical coolant section is placed ahead of the filter section so that alumina present in the gases begins to solidify ahead of the filter and may be more efficiently removed.

9 Claims, 2 Drawing Figures

FILTER/COOLER

CROSS REFERENCE TO RELATED APPLICATION

The devices disclosed in this application are similar in some respects to those disclosed in assignee's copending application Ser. No. 480,189 filed June 14, 1974.

BACKGROUND OF THE INVENTION

This invention relates to rocket motors and particularly to the use of rocket motor bleed gases for actuation of rocket control accessories. Based on the fact that the main rocket motor chamber can supply gas for actuation of thrust vector control means and thrust modulation control devices, for example, without impairing motor performance, a system which converts motor chamber gas to usable gas can eliminate a separate power source for this purpose.

The concept of conditioning motor bleed gases is fairly new and there are only a few designs using this concept. Of these designs, only a very few use a decomposing chemical to cool the gases and none of the known designs use a coolant as an aid to alumina filtration.

The consensus in the trade has been that aluminum oxide in hot gases can be easily filtered without cooling. However, this has not been found to be the case because, at elevated temperatures, the aluminum or its compounds are liquid and very difficult or impossible to remove by filtration.

According to the present invention, a filter cooler is provided which considerably lowers the temperature of the hot gases before filtering so that alumina in the gases is more easily and efficiently removed.

Figure 1:
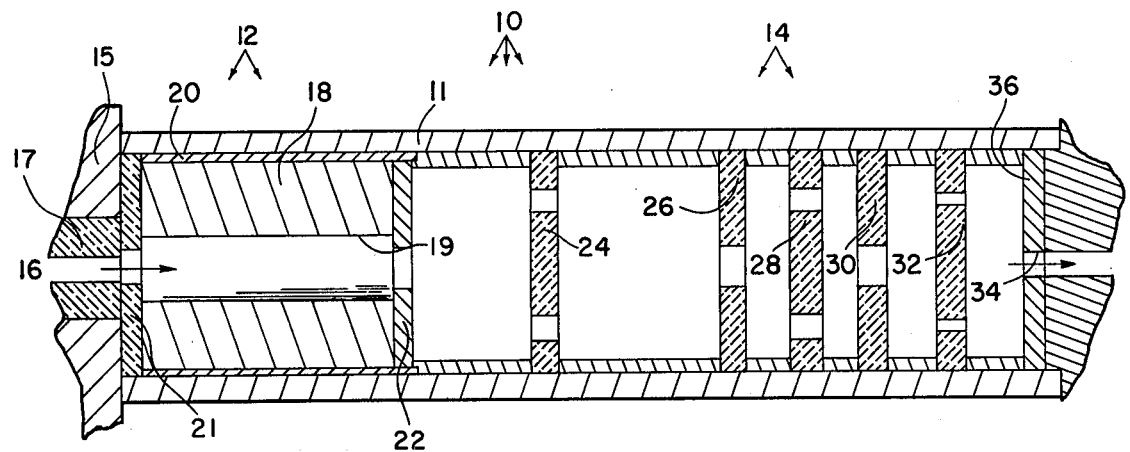
FIG. 1 is a longitudinal cross-sectional view of one embodiment of the present invention.

Shown in FIG. 1 is a filter/cooler 10 comprising a metal casing 11 housing a coolant section 12 and a filter section 14. The device is attached to a rocket motor (not shown) by means of a fixture 15 and hot motor gases 16 are bled through an insulative tube 17 of asbestos phenolic or the like.

The coolant section 12 comprises a hollow cylinder of decomposable chemical coolant 18 having a central bore 19 substantially coaxial with the tube 17. The coolant material is insulated from the casing 11 by a sleeve 20 of insulative material and the ends of the coolant are surmounted by an entrance baffle 21 and exit baffle 22 of the same insulative material. The insulative material in these and all other insulative portions are preferably of the same asbestos phenolic materials as in 17 above. Examples of decomposing chemical coolant materials include ammonium formate, calcium carbonate, ammonium fluoride, ammonium chloride, ammonium oxalate, succinic acid, and ammonium acetate.

Some of these coolant materials may also be advantageously combined with a Teflon (polytetrafluoroethylene) or polyvinyl acetate (PVA) binder. For example, one embodiment tested comprised two coolant sections wherein the first coolant section consisted of ammonium formate with a 16% Teflon binder and the second coolant section consisted entirely of calcium carbonate. Another coolant section tested consisted of succinic acid with a 10% polyvinyl acetate binder.

The above percentages are by weight and the composite blocks of coolant were formed by pressing a dry mix of the ingredients in a mold at about 7500 psi. The molded blocks were then machined to size. Experimentation has also been done with extruding the mixed material through shaping dies at a temperature of about 190°. The following table indicates test results with various coolant materials where the temperature of the entering gases was 5800° F.

TABLE

| Coolant | Avg Temp | Max Temp | Avg M* | Comments |
|---|---|---|---|---|
| Ammonium formate | 1000° F | 1300° F | .013 | Exhaust nozzle plugged, unsatisfactory coolant |
| Graphite | 2600° F | 2900° F | .120 | Using effective filtration, fair coolant |
| Ammonium formate + Teflon | 2300° F | 2650° F | .075 | Considerable initial smoke, good coolant |
| Calcium carbonate | 2800° F | 3200° F | .073 | Some smoke throughout firing, fair coolant |
| Ammonium oxalate + Teflon | 2700° F | 3000° F | .099 | Excellent alumina filtration with only little smoke, good coolant |
| Ammonium chloride + Teflon | 2600° F | 2700° F | .056 | Exhaust nozzle plugged with coolant, fair coolant |
| Ammonium fluoride + PVA | 2200° F | 2750° F | .093 | Excellent alumina filtration with little smoke, very good coolant |
| Ammonium acetate + PVA | 2000° F | 2550° F | .094 | Excellent alumina filtration with some smoke, very good coolant |

*MASS FLOW RATE; LB/SEC.

Filter section 14 comprises a plurality of baffles or filter elements 24, 26, 28, 30 and 32 of pressed graphite, for example, having one or more holes for passage of gases. Alternate elements have a single central hole and the remaining ones have a plurality of peripherally spaced holes. This arrangement causes the gases to follow a tortuous path to the exit port 34 leading to gas operated accessories.

Figure 2:
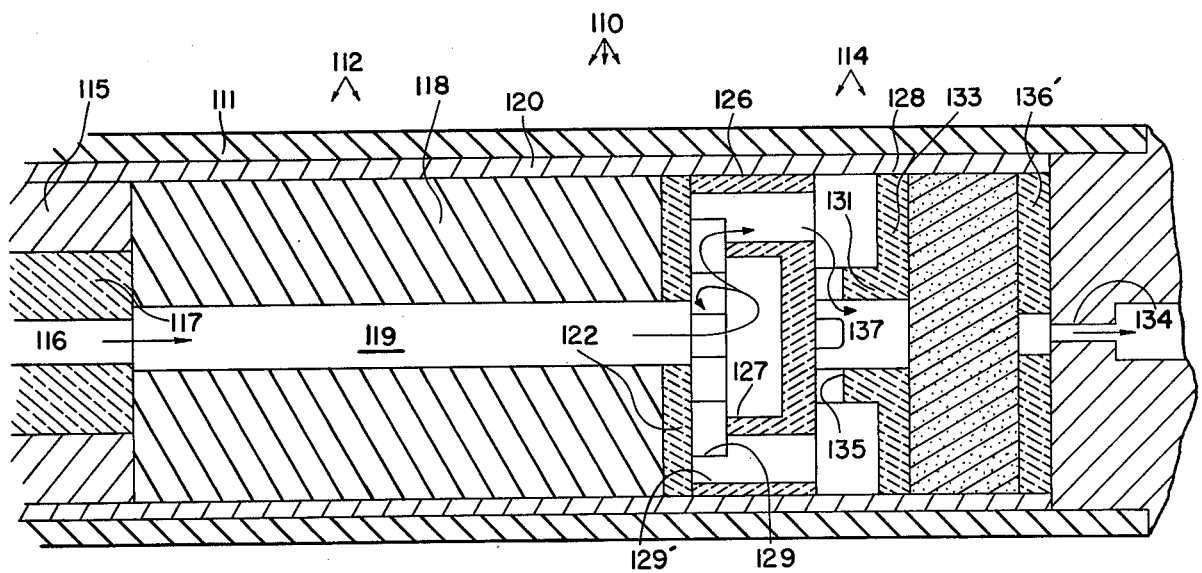
FIG. 2 is a view similar to FIG. 1 showing a second embodiment of the invention.

In the FIG. 2 embodiment, like numbers increased by 100 have been used for like parts. The filter/cooler 110 is shown with a larger coolant section 112 and a smaller modified filter section 114. No entrance baffle is used between fixture 115 and coolant 118 and exit baffle 122 has an opening substantially coextensive with the bore 119 of the coolant material.

A pair of contiguous baffles 126, 128 of refractory material such as pressed graphite are arranged to provide a tortuous path for the gases after passing the coolant section. Element 126 is bored about three quarters through at 127 and counterbored about one quarter through at 129. A plurality of through holes 129' around the periphery thus communicate with the central bore. Element 128 comprises an annular member having a cylindrical central portion 131 and an integral circular end wall 133. Portion 131 is slotted at four places as shown at 135 providing communication for gases from element 126 through bore 137 of element 128.

Abutting the end wall 133 of element 128 and coextensive therewith is a filter element 136 of metal mesh or wool preferably of a stainless steel alloy and an exit baffle 136' is placed after the mesh filter before exit port 134.

From the foregoing it may be seen that the use of endothermically decomposing solid coolants upstream of a mechanical filter section will provide treated gases from a rocket chamber sufficiently cooled and cleaned to be used in gas operated accessories even where the gases contain aluminum oxide in a fluid state.

What is claimed is:

1. For use in conditioning hot gases bled from a rocket chamber,
   a filter cooler comprising:
   a housing;
   a hollow block of solid material in said housing acting as a conduit for said gases and endothermically reacting therewith;
   said hollow block consisting of a solidified mixture of 84 to 90% decomposable chemical coolant and 10 to 16% plastic binder;
   a plurality of filter elements in said housing collectively providing a tortuous path for conduit of said gases after passage through said hollow blocks; and
   a wire mesh filter element in the path of said gases after passage through said filter elements providing said tortuous path.

2. The apparatus of claim 1 wherein said decomposable chemical coolant is selected from the group consisting of;
   ammonium formate;
   ammonium oxalate;
   ammonium chloride;
   ammonium fluoride;
   ammonium acetate; and
   succinic acid.

3. The apparatus of claim 2 wherein said binder consists of polytetrafluoroethylene.

4. The apparatus of claim 2 wherein said binder consists of polyvinyl acetate.

5. For use in conditioning hot gases bled from a rocket chamber a filter cooler comprising:
   a housing;
   a hollow block of solid material in said housing acting as a conduit for said gases and endothermically reacting therewith;
   said hollow block comprising a solidified mixture of 84 to 90% decomposable chemical coolant and 10 to 16% plastic binder; and
   a plurality of filter elements in said housing collectively providing a tortuous path for conduit of said gases after passage through said hollow block.

6. Filter cooler means according to claim 5 wherein said decomposable chemical coolant is selected from the group consisting of;
   ammonium formate;
   ammonium oxalate;
   ammonium chloride;
   ammonium fluoride;
   ammonium acetate; and
   succinic acid.

7. The apparatus of claim 6 wherein said binder consists of polytetrafluoroethylene.

8. The apparatus of claim 6 wherein said binder consists of polyvinyl acetate.

9. In a method of treating hot aluminized gases emanating from a rocket motor to obtain sufficiently clean gases at a lowered temperature useful for operating auxiliary power devices; the steps comprising;
   passing said hot gases through an aperture running through a block of solid material which is endothermically reactive with said gases;
   said solid material comprising 84 to 90% by weight of chemical coolant selected from the group consisting of;
   ammonium formate;
   ammonium oxalate;
   ammonium chloride;
   ammonium fluoride;
   ammonium acetate;
   succinic acid; and
   said solid material also comprising 10% to 16% by weight of plastic binder; and
   thereafter passing said gases through a plurality of filter elements which collectively force said gases to follow a tortuous path.

* * * * *